US010368242B2

(12) United States Patent
Dowlatkhah et al.

(10) Patent No.: US 10,368,242 B2
(45) Date of Patent: Jul. 30, 2019

(54) SYSTEM AND METHOD FOR UNIFIED AUTHENTICATION IN COMMUNICATION NETWORKS

(71) Applicant: AT&T Intellectual Property I, L.P., Atlanta, GA (US)

(72) Inventors: Sangar Dowlatkhah, Alpharetta, GA (US); Venson Shaw, Kirkland, WA (US); Thomas J Will, Skillman, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 5 days.

(21) Appl. No.: 15/794,092

(22) Filed: Oct. 26, 2017

(65) Prior Publication Data

US 2018/0070235 A1 Mar. 8, 2018

Related U.S. Application Data

(63) Continuation of application No. 15/398,463, filed on Jan. 4, 2017, now Pat. No. 9,832,645, which is a
(Continued)

(51) Int. Cl.
*H04L 29/00* (2006.01)
*H04W 12/06* (2009.01)
(Continued)

(52) U.S. Cl.
CPC ............ *H04W 12/06* (2013.01); *H04L 63/08* (2013.01); *H04L 63/0892* (2013.01);
(Continued)

(58) Field of Classification Search
CPC ... H04W 12/06; H04L 63/0892; H04L 63/107
(Continued)

(56) References Cited

U.S. PATENT DOCUMENTS 7,158,777 B2 * 1/2007 Lee .................. H04L 63/08
455/410
7,236,477 B2 6/2007 Emeott et al.
(Continued)

FOREIGN PATENT DOCUMENTS

CN 101212798 A 7/2008
JP 2008113427 A 5/2008
(Continued)

OTHER PUBLICATIONS

"Aptilo SIM Authentication Server," www.aptilo.com http://www.aptilo.com/aptilo-eap-sim-authentication-server/eap-sim-aka, Apr. 21, 2014.
(Continued)

*Primary Examiner* — Jeffrey C Pwu
*Assistant Examiner* — Michael D Anderson
(74) *Attorney, Agent, or Firm* — Guntin & Gust, PLC; Robert Gingher

(57) ABSTRACT

Aspects of the subject disclosure may include, for example, a method comprising authenticating, by a server comprising a processor, a communication device to a first communication network, in accordance with authentication information stored in a first repository of the first communication network. The method also comprises determining, by the server, that a second communication network is accessible to the communication device. The method further comprises providing, by the server, the authentication information to a second repository of the second communication network in accordance with the determining, wherein the providing is performed independently of a request from the second communication network. Other embodiments are disclosed.

20 Claims, 9 Drawing Sheets

Related U.S. Application Data continuation of application No. 14/307,638, filed on Jun. 18, 2014, now Pat. No. 9,560,525.

(51) Int. Cl.

| | | |
|---|---|---|
| *H04L 29/06* | (2006.01) | |
| *H04W 48/18* | (2009.01) | |
| *H04W 4/02* | (2018.01) | |
| *H04W 12/08* | (2009.01) | |
| *H04W 84/12* | (2009.01) | |
| *H04W 88/06* | (2009.01) | |

(52) U.S. Cl.
CPC ............. *H04L 63/107* (2013.01); *H04W 4/02* (2013.01); *H04W 12/08* (2013.01); *H04W 48/18* (2013.01); *H04W 84/12* (2013.01); *H04W 88/06* (2013.01)

(58) Field of Classification Search
USPC ............................................................ 726/7
See application file for complete search history.

(56) References Cited

U.S. PATENT DOCUMENTS

| | | | |
|---|---|---|---|
| 8,131,296 | B2 | 3/2012 | Chiou et al. |
| 8,320,334 | B2 | 11/2012 | Thomas et al. |
| 8,434,132 | B2 | 4/2013 | Gupta et al. |
| 8,531,945 | B2 | 9/2013 | Chandrachood et al. |
| 8,561,135 | B2 | 10/2013 | Upp |
| 8,594,665 | B2 | 11/2013 | Anschutz |
| 8,594,668 | B2 | 11/2013 | Hoeksel et al. |
| 8,634,346 | B2 | 1/2014 | Velandy et al. |
| 2004/0162068 | A1 | 8/2004 | Lamb et al. |
| 2005/0054329 | A1 | 3/2005 | Kokudo |
| 2007/0086359 | A1 | 4/2007 | Yaqub et al. |
| 2011/0032939 | A1 | 2/2011 | Nozaki et al. |
| 2011/0154464 | A1 | 6/2011 | Agarwal et al. |
| 2011/0222523 | A1 | 9/2011 | Fu et al. |
| 2012/0258707 | A1* | 10/2012 | Mathias ................ H04W 36/30 455/426.1 |
| 2013/0115915 | A1 | 5/2013 | Tipton et al. |
| 2013/0182625 | A1 | 7/2013 | Kuehnel et al. |
| 2013/0217427 | A1 | 8/2013 | Bajko |
| 2013/0329583 | A1 | 12/2013 | Vrzic et al. |
| 2014/0071969 | A1 | 3/2014 | Roeland |
| 2017/0118646 | A1 | 4/2017 | Dowlatkhah et al. |

FOREIGN PATENT DOCUMENTS

| | | |
|---|---|---|
| KR | 20040028062 | 4/2004 |
| KR | 20080073556 | 8/2008 |

OTHER PUBLICATIONS

"AT&T Auto-Authentication on iPhone OS 3.0," www.att.com http://www.att.com/gen/press-room?pid=4800&cdvn=news&newsarticleid=26865, Jun. 17, 2009.

"Portal-Based Authentication," www.cisco.com http://www.cisco.com/c/en/us/solutions/collateral/service-provider/service-providerwi-fi/white_paper_c11-701018.html, Apr. 21, 2014.

F. Steuer et al., "Seamless mobility over broadband wireless networks," Proceedings of 14th IST Mobile and Wireless Communications Summit, Dresden, Germany, Jun. 2005, 5 pgs.

M.S. Bargh et al., "Fast authentication methods for handovers between IEEE 802.11 wireless LANs," Proceedings of the 2nd ACM international workshop on Wireless Mobile Applications and Services on WLAN Hotspots (WMASH), Philadelphia, PA, Oct. 2004, 11 pgs.

\* cited by examiner

100

200

300

500

SYSTEM AND METHOD FOR UNIFIED AUTHENTICATION IN COMMUNICATION NETWORKS

CROSS-REFERENCE TO RELATED APPLICATIONS

This application is a continuation of U.S. application Ser. No. 15/398,463, filed Jan. 4, 2017, which is a continuation of U.S. application Ser. No. 14/307,638, filed Jun. 18, 2014 (now U.S. Pat. No. 9,560,525), which are incorporated by reference herein in their entirety.

FIELD OF THE DISCLOSURE

The subject disclosure relates to a system and method for authenticating mobile devices that move between different networks.

BACKGROUND

Subscribers to wireless communication networks often move their mobile devices from one type of communication network to another, for example from a 3G or LTE network (mobility network) to a Wi-Fi network. Each movement to a different communication network typically requires that an authentication procedure be performed for the device on that communication network.

BRIEF DESCRIPTION OF THE DRAWINGS

Reference will now be made to the accompanying drawings, which are not necessarily drawn to scale, and wherein.

DETAILED DESCRIPTION

Figure 1:
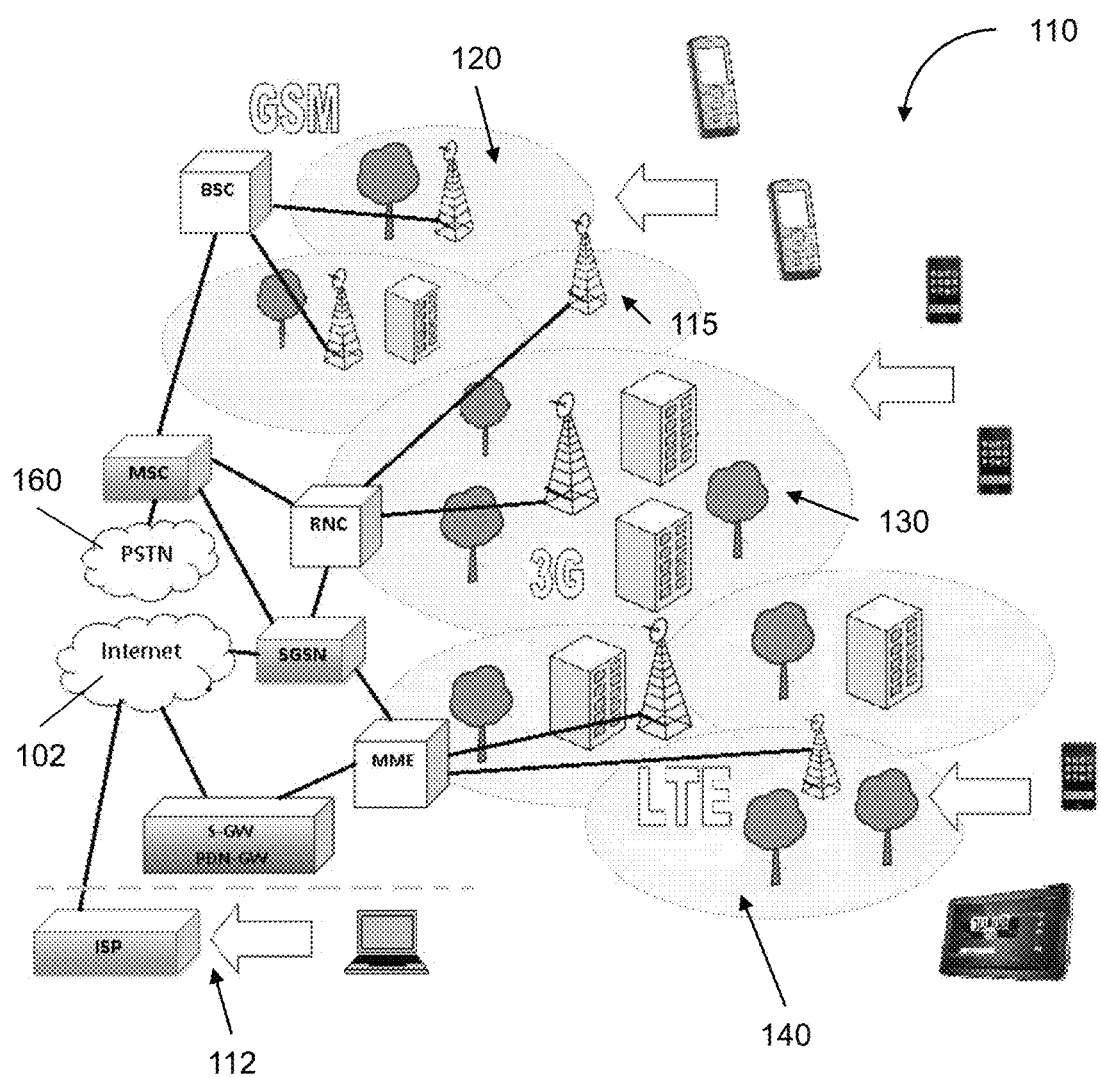
FIG. 1 depicts an illustrative embodiment of an architecture for a cellular network for interacting with mobile communication devices.

The subject disclosure describes, among other things, illustrative embodiments for a unified authentication procedure for a communication device accessing different communication networks (e.g. a mobility network and a Wi-Fi network). Other embodiments are described in the subject disclosure.

One or more aspects of the subject disclosure include storing authentication credentials for a communication device on a first network, determining that a second network is accessible by the communication device, and automatically pushing the authentication credentials to a repository of the second network. This permits the communication device to be authenticated to the second network without the need for further communication between the first and second communication networks.

One embodiment of the subject disclosure includes a server comprising a memory to store instructions and a controller coupled to the memory. The controller, responsive to executing the instructions, performs operations. The operations comprise receiving a first request from a communication device for authentication to a first communication network, authenticating the communication device to the first communication network, and storing authentication information regarding the communication device in a first repository of the first communication network. The operations also comprise receiving location information for the communication device, and determining that a second communication network is accessible to the communication device in accordance with the location information. The operations further comprise providing the authentication information to a second repository of the second communication network in accordance with the determining, the authentication information thereby being available in the second repository in advance of a second request for authentication from the communication device to the second communication network.

One embodiment of the subject disclosure includes a non-transitory a non-transitory computer-readable storage device comprising instructions. The instructions, when executed by a processor, cause the processor to perform operations. The operations comprise authenticating a communication device to a first communication network, and determining that a second communication network is accessible to the communication device. The operations further comprise providing authentication information, stored in a first repository of the first communication network, regarding the communication device to a second repository of the second communication network in accordance with the determining, the authentication information thereby being available in the second repository in advance of a second request for authentication of communication device to the second communication network.

One embodiment of the subject disclosure includes a method comprising authenticating, by a server comprising a processor, a communication device to a first communication network, in accordance with authentication information stored in a first repository of the first communication network. The method also comprises determining, by the server, that a second communication network is accessible to the communication device. The method further comprises providing, by the server, the authentication information to a second repository of the second communication network in accordance with the determining, wherein the providing is performed independently of a request from the second communication network.

FIG. 1 schematically illustrates an architecture 100 for wireless communication networks with different (typically overlapping) regions of coverage. Mobile devices 110 with a variety of technologies (phones, tablets, etc.) have an end-to-end connection established with either the Public Switched Telephone Network (PSTN) 160, in the case of voice traffic, or an internet protocol network (Internet) 102, in the case of data traffic. The architecture can include a GSM network 120, a 3G network 130, and/or an LTE network 140. In particular, LTE specifications define an all-internet protocol architecture with voice over internet protocol (VoIP). FIG. 1 also illustrates a device accessing the network through an Internet Service Provider (ISP) broadband connection 112. GSM, 3G and LTE networks are referred to herein generally as mobility networks.

Figure 2:
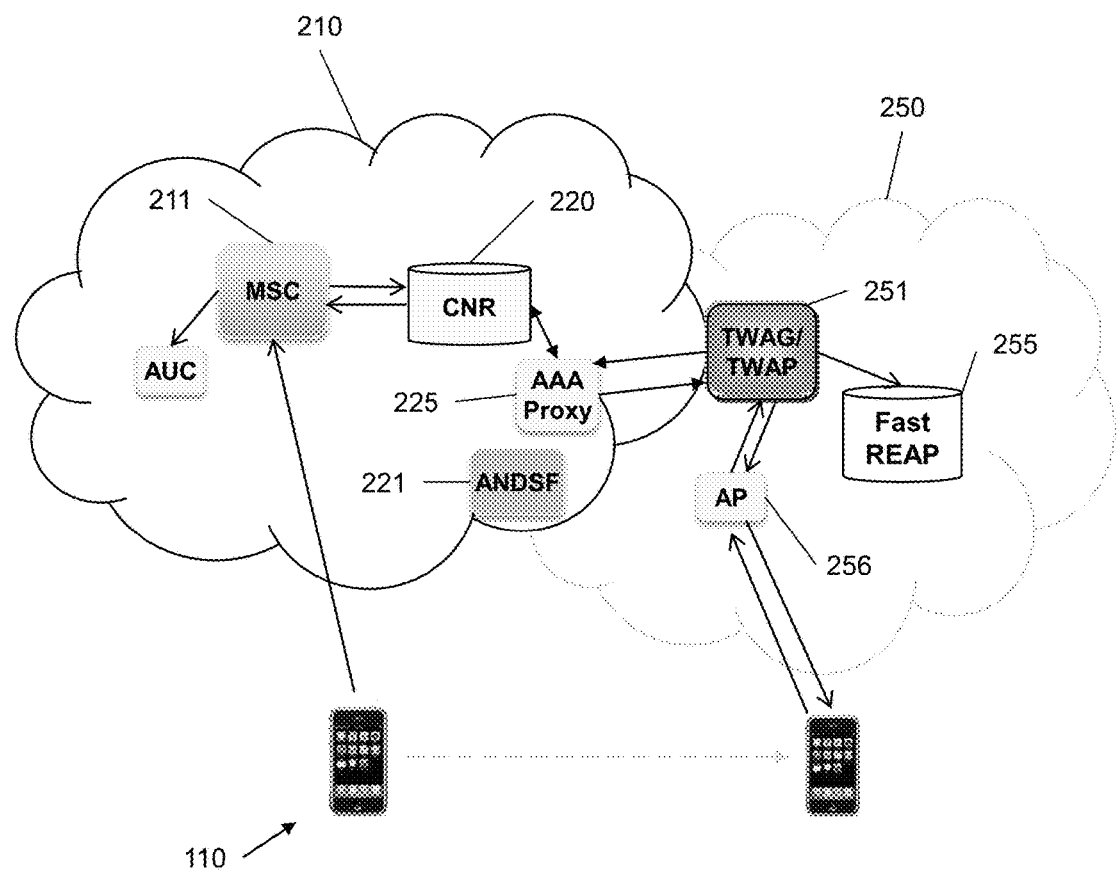
FIG. 2 depicts an illustrative embodiment of authentication procedures in wireless networks.

FIG. 2 schematically illustrates a procedure 200 in which a mobile communication device 110 of a subscriber is authenticated to mobility network 210, and then moves to a region covered by Wi-Fi network 250. In order to access the mobility network, device 110 transmits an authentication request to mobile switching center (MSC) 211, which forwards the request to consolidated network repository (CNR) 220. The CNR has stored therein the authentication credentials for the subscriber, and performs the authentication procedure. However, when the device changes location so that communication via Wi-Fi network 250 is desired, the device must be authenticated to the Wi-Fi network. A new authentication request from device 110, accessing network 250 at Wi-Fi access point (AP) 256, is sent to the Trusted WAN Access Gateway/Proxy (TWAG/TWAP) 251. In this example, the subscriber credentials are not available to the TWAG/TWAP on the Wi-Fi network. The TWAG/TWAP therefore must communicate back to the mobility network, via the Authentication Authorization Accounting (AAA) proxy 225 of the mobility network, to transmit the Wi-Fi authentication request to the CNR 220. The CNR then performs a new authentication procedure, the results of which are transmitted through AAA proxy 225 to TWAG/TWAP 251.

Figure 3:
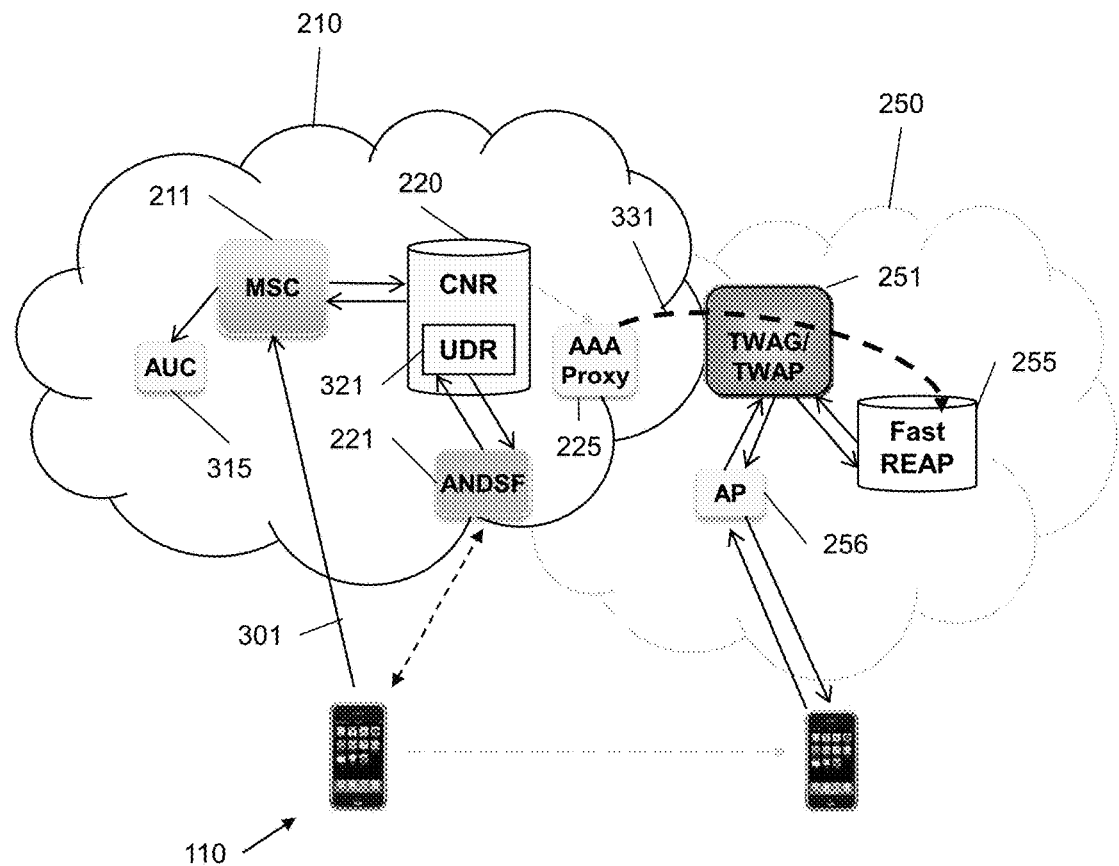
FIG. 3 depicts a unified authentication procedure for a mobile device moving between wireless communication networks, in accordance with an embodiment of the disclosure.

FIG. 3 schematically illustrates a procedure 300 according to an embodiment of the disclosure, in which device 110 can be authenticated to Wi-Fi network 250 without requiring further signaling between Wi-Fi network 250 and mobility network 210. In this embodiment, authentication center (AUC) 315 stores information regarding the authentication performed by CNR 220, and information regarding the location of device 110. The location information is updated as the device moves. The access network discovery and selection function (ANDSF) 221 can determine when device 110 has moved into the region covered by Wi-Fi network 250. The ANDSF updates a network discovery data repository UDR 321 in the CNR regarding accessibility to the subscriber device of the Wi-Fi network. This prompts the CNR to initiate a transfer (push) 331 of the authenticated subscriber credentials to the Wi-Fi network 250 via AAA proxy 225.

The AAA proxy communicates with TWAG/TWAP 251, which stores the credentials at a storage facility in communication with TWAG/TWAP 251. In this example, the subscriber device authentication credentials are stored in re-expedited authentication protocol repository (Fast REAP) 255.

When device 110 sends an authentication request to the Wi-Fi network at access point 256, the TWAG/TWAP can retrieve the authenticated subscriber credentials from Fast REAP 255. The TWAG/TWAP can complete the authentication process on the Wi-Fi network for device 110 and send an acknowledgment via AP 256. In this embodiment, the credential push 331 permits authentication to the Wi-Fi network without additional signaling traffic between the mobility network 210 and the Wi-Fi network 250.

Figure 4:
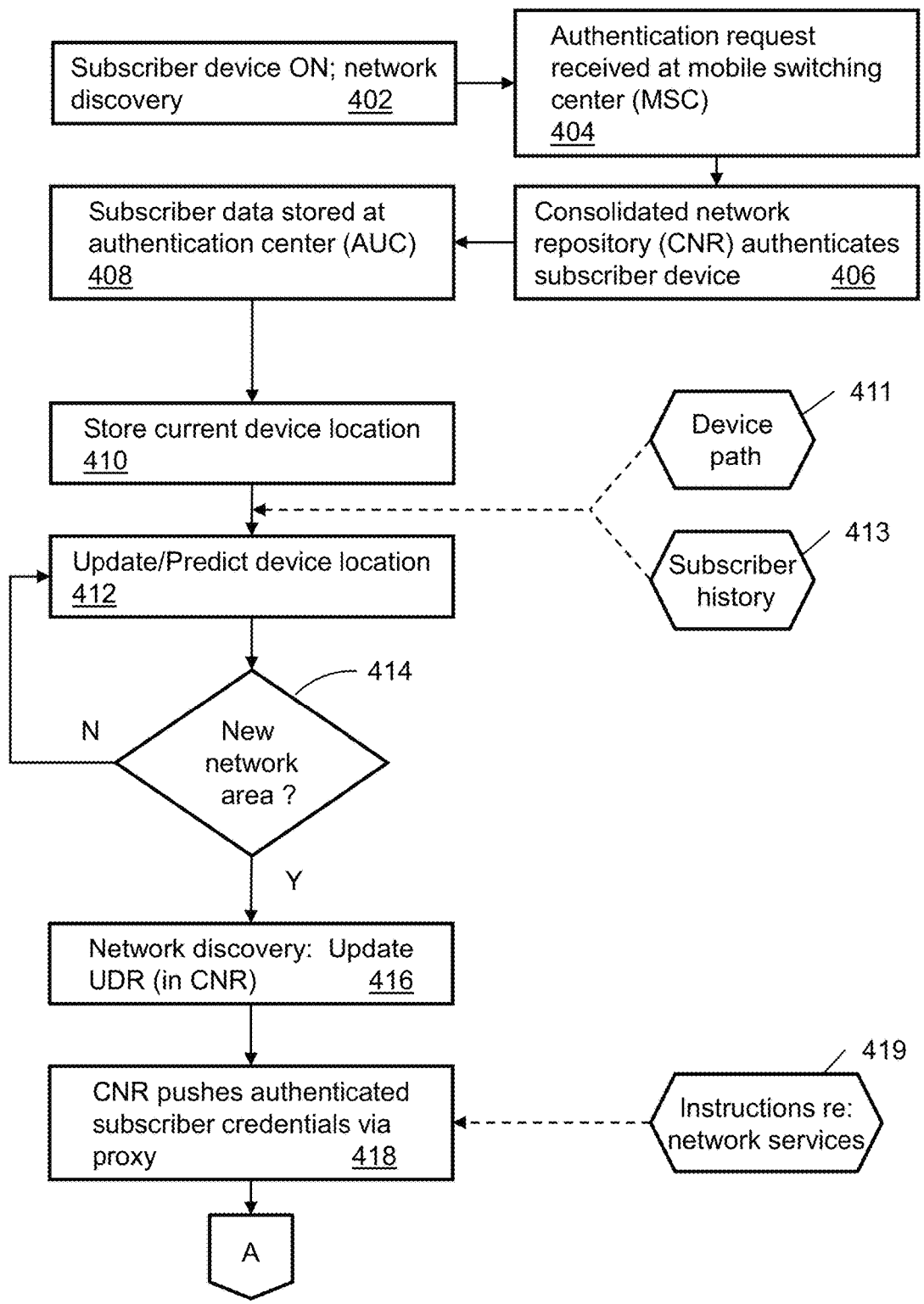
FIGS. 4-5 are connected flowcharts illustrating procedures for authenticating a mobile device moving between networks, in accordance with embodiments of the disclosure.
Figure 5:
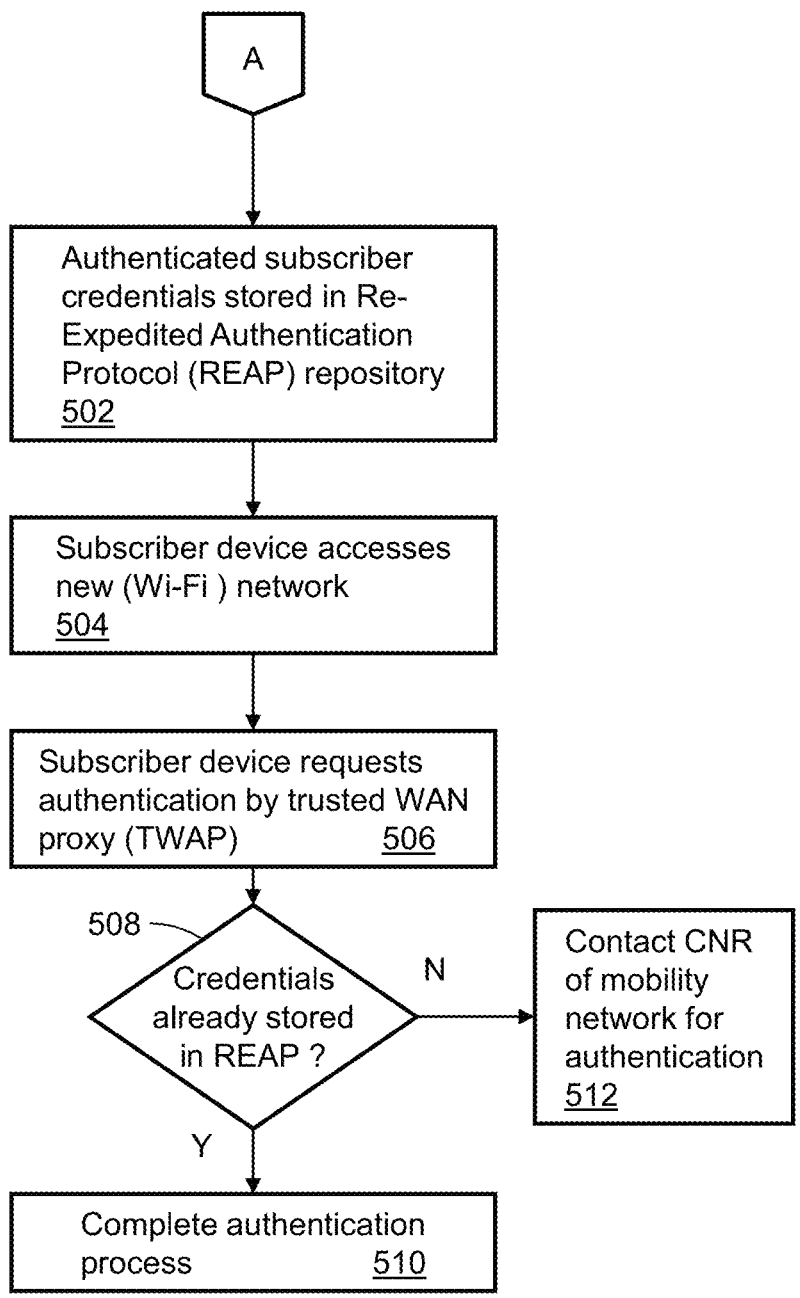

FIGS. 4 and 5 are connected flowcharts illustrating a procedure for authenticating a subscriber mobile device to both a mobile network and a Wi-Fi network, in accordance with an embodiment of the disclosure. This may be viewed as a unified authentication procedure, since the authentication is valid for both networks.

In the first portion 400 of the procedure, the subscriber device is authenticated to the mobility network. When the subscriber device 110 is powered ON (step 402), the access network discovery and selection function (ANDSF) 221 of the mobile network causes the device to automatically send an authentication request 301 to the MSC 211 (step 404). In other embodiments, the authentication request can be sent to a serving general packet radio services support node (SGSN) or a mobility management element (MME). The authentication request is sent from the MSC to the consolidated network repository (CNR) 220, which then authenticates the subscriber device based on subscriber credentials stored in the CNR and/or in the AUC (step 406). The AUC 315 stores data pertinent to the authentication (step 408), and also stores information regarding location of the device 110 (step 410). The AUC is updated each time the device performs a location update (step 412)

If the device 110 moves to an area where a Wi-Fi network is accessible to the device (step 414), the ANDSF 221 updates the UDR 321 with this information (step 416). In this embodiment, the ANDSF signals the device that the Wi-Fi network is available, and populates the UDR with the subscriber credentials based on location of the device in the Wi-Fi network coverage area. The CNR then triggers a transmission of the already authenticated subscriber credentials (credential push 331) via the AAA proxy 225 onto the Wi-Fi network (step 418). In this embodiment, the AAA proxy 225 communicates with the TWAG/TWAP 251 in the Wi-Fi network, so that the credentials are pushed to the TWAG/TWAP and then stored (as shown schematically in FIG. 3). In this embodiment, these steps are performed on the basis of detected movement of the subscriber device into the Wi-Fi network coverage area, and generally are completed before the device accesses the Wi-Fi network.

FIG. 5 illustrates the continuation 500 of the procedure, in which the subscriber device is authenticated to the Wi-Fi network. In step 502, the authenticated subscriber credentials are stored in the Fast REAP repository 255. The subscriber device accesses the Wi-Fi network at access point (AP) 256 (step 504), and sends an authentication request to TWAP (step 506). The TWAP checks the Fast REAP repository for the subscriber credentials (step 508). In this example, the subscriber's credentials have already been pushed and stored in the Fast REAP repository, so that the TWAP obtains those credentials from the Fast REAP repository and does not need to send the authentication request to the CNR of the mobility network. The TWAP then sends an acknowledgment to the device via the AP and completes the Wi-Fi authentication process (step 510) without added signaling traffic in the mobility network.

It will be appreciated that in the unified authentication procedure, the only outgoing signal from the mobility network to the Wi-Fi network is the credential push 331 from the CNR via the AAA proxy. The TWAP contacts the CNR to obtain information regarding the subscriber only in the event that the subscriber's credentials are not found in the Fast REAP repository (step 512).

It will be appreciated that if the device subsequently moves from the Wi-Fi network coverage area to the mobility network coverage area, the device will then be authenticated to the mobility network also. Accordingly, the unified authentication procedure results in valid authentication for a device that repeatedly transits between the mobility network and the Wi-Fi network.

In another embodiment, the ANDSF can predict movement of the subscriber device from the mobility network to the WiFi network, based on information 411 regarding the path traveled by the device, information 413 regarding past subscriber behavior, etc. The subscriber's credentials thus can be pushed to a selected WiFi network before the subscriber device moves to that network.

In a further embodiment, the credential push can also include instructions 419 regarding services that will be offered to the subscriber using the WiFi network. For example, the subscriber may be authenticated to the WiFi network only for a limited range of services, restricted bandwidth, etc.

Figure 6:
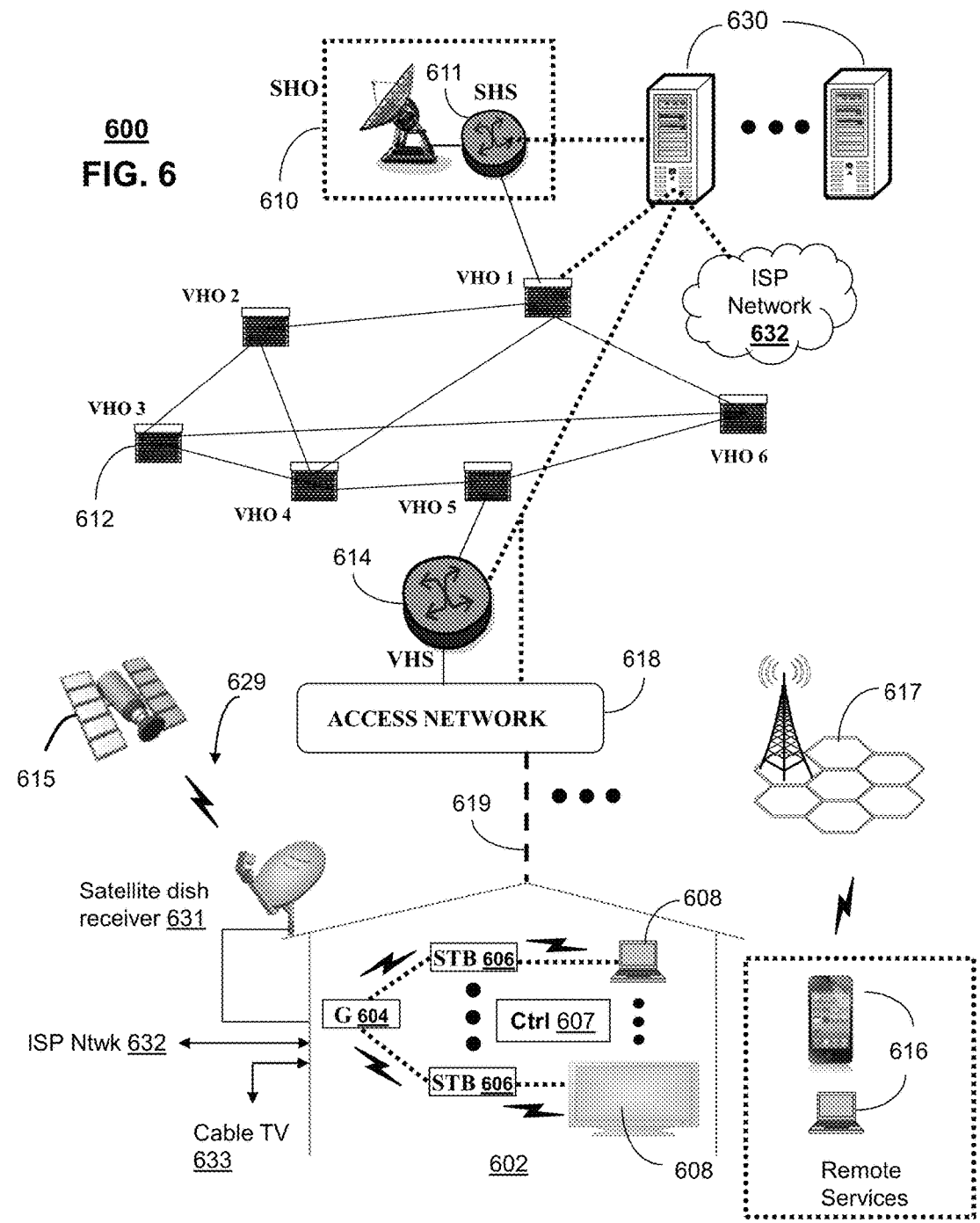
FIG. 6 depicts an illustrative embodiment of a communication system including a wireless communication network.

FIG. 6 depicts an illustrative embodiment of a communication system 600 for delivering media content. The communication system 600 can represent a broadcast media system. Communication system 600 can be overlaid or operably coupled with a mobile communication network as shown in FIGS. 1-3. For instance, one or more devices illustrated in the communication system 600 of FIG. 6 can provide repository, gateway or proxy functions of the mobile communication networks described above.

The media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a network server providing various services to wireless communication devices that have been authenticated to the network. In particular, the server 630 can perform the unified authentication procedure for a mobility network 635. In addition, the media processors 606 and wireless communication devices 616 can be provisioned with software functions to utilize the services offered via network server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
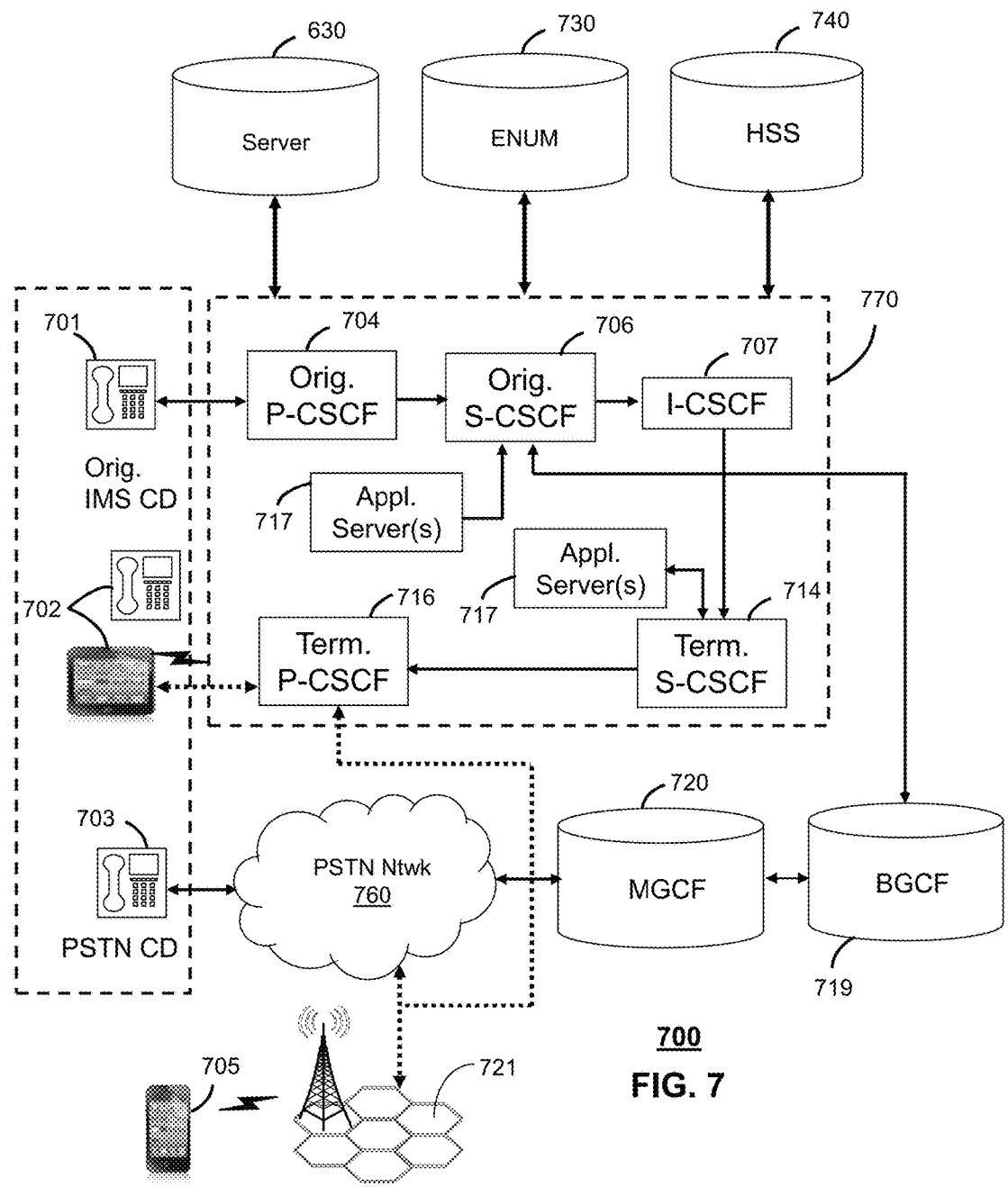
FIG. 7 depicts an illustrative embodiment of a communication system including telephone networks.

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with a mobile communication network as shown in FIGS. 1-3 as another representative embodiment of communication system 600.

Communication system 700 can comprise a Home Subscriber Server (HSS) 740, a tElephone NUmber Mapping (ENUM) server 730, and other network elements of an IMS network 770. The IMS network 770 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 770 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 770 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 770 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can perform authentication functions including the unified authentication procedure and thereby provide authentication services to the CDs 701, 702, 703 and 705 of FIG. 7. CDs 701, 702, 703 and 705 can be adapted with software to utilize the services of the server 630 (in particular, authentication to a communication network) similarly to communication device 110 as described above with reference to FIGS. 1-5. Server 630 can also be an integral part of the application servers 717 and adapted to the operations of the IMS network 770.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
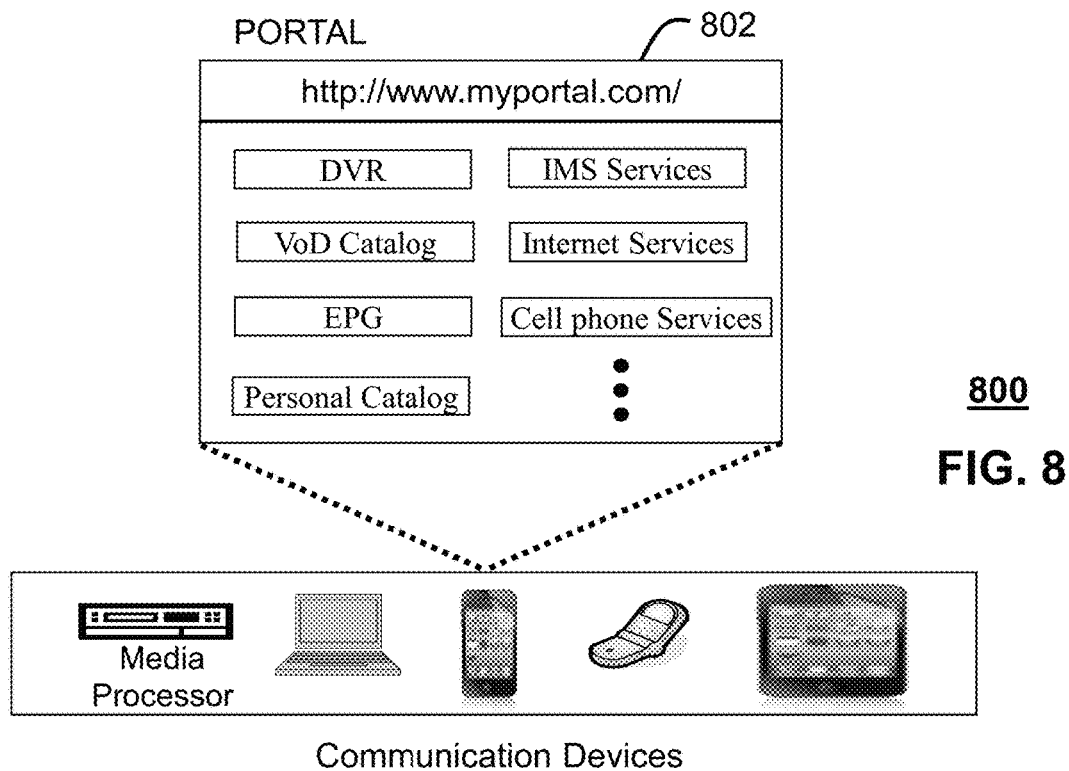
FIG. 8 depicts an illustrative embodiment of a web portal for interacting with the communication systems of FIGS. 6 and 7.

FIG. 8 depicts an illustrative embodiment of a web portal 802 of a communication system 800. Communication system 800 can be overlaid or operably coupled with communication system 600, and/or communication system 700 as another representative embodiment of a mobile communication network as described in FIGS. 1-5. The web portal 802 can be used for managing services of the mobile communication network and communication systems 600-700. A web page of the web portal 802 can be accessed by a Uniform Resource Locator (URL) with an Internet browser using an Internet-capable communication device (for example, mobile devices 110, 616 or 705). The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

Figure 9:
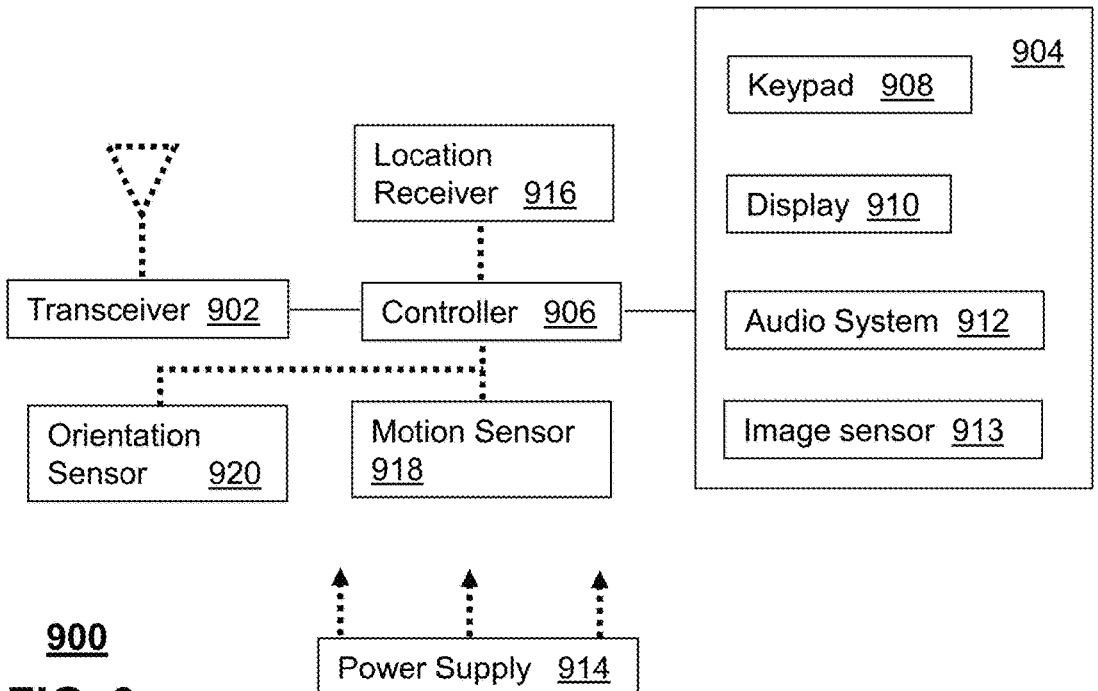
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-3 and 6-8.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of mobile communication devices shown in FIGS. 1-3, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in mobility network 210, Wi-Fi network 250, or in communication systems 600-700 of FIGS. 6-7 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
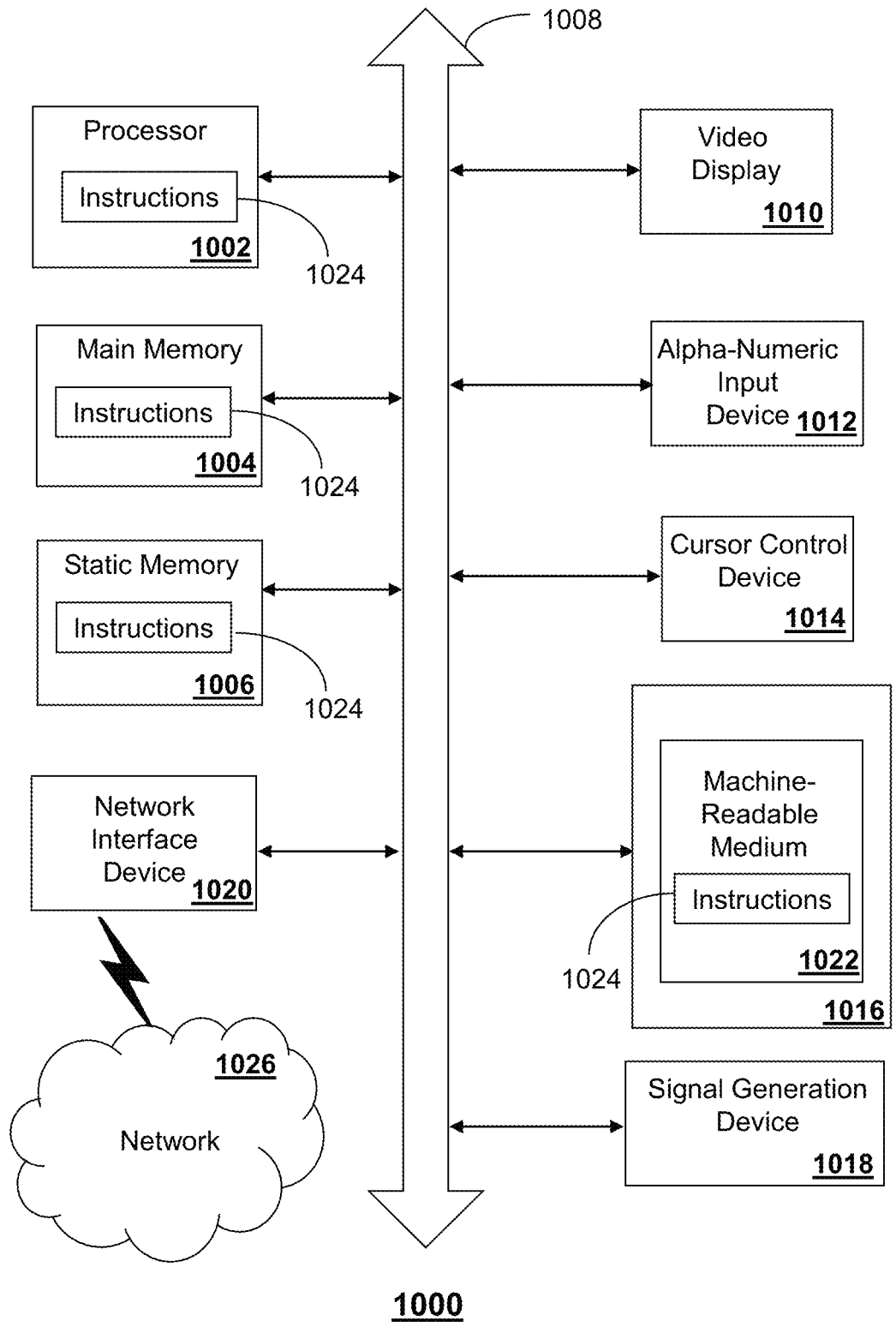
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the network server 630, the CNR 220, the AUC 315, the TWAG/TWAP 251, the AAA proxy 225, and other devices of FIGS. 1-3. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   sending, by a processing system including a processor of a mobile communication device, a first authentication request to a first communication network, wherein the mobile communication device is authenticated to the first communication network based on a credential accessible to a network element of the first communication network;
   sending, by the processing system, information regarding a location of the mobile communication device to the first communication network, wherein the first communication network updates the location of the mobile communication device based on the information and determines a predicted path upon which the mobile communication device is predicted to travel;

receiving, by the processing system, a signal via the first communication network that a second communication network is available in the predicted path of the mobile communication device, wherein the network element transmits the credential to the second communication network based on the predicted path;

accessing, by the processing system, the second communication network, wherein the credential is stored prior to the accessing;

sending, by the processing system, a second authentication request to the second communication network; and receiving, by the processing system, via the second communication network, an acknowledgement of authentication to the second communication network based on the transmitted credential.

2. The method of claim 1, wherein the first authentication request is sent to a switching center of the first communication network.

3. The method of claim 1, wherein the mobile communication device is a subscriber device associated with a subscriber to the first communication network.

4. The method of claim 3, wherein the mobile communication device is authenticated to the first communication network based on a subscriber credential stored in a data repository of the first communication network.

5. The method of claim 4, wherein the data repository is updated with information regarding accessibility of the second communication network to the mobile communication device.

6. The method of claim 3, wherein the first authentication request is automatically sent responsive to the subscriber device being powered ON.

7. The method of claim 6, wherein an access network discovery and selection function (ANDSF) of the first communication network causes the mobile communication device to send the first authentication request.

8. The method of claim 1, wherein the first communication network comprises a mobility network, and wherein the mobility network comprises an LTE network, a 3G network or a GSM network.

9. The method of claim 1, wherein the second communication network comprises a Wi-Fi network.

10. A device comprising:
a processing system including a processor; and
a memory storing executable instructions that, when executed by the processing system, facilitate performance of operations comprising:
sending a first authentication request to a first communication network, wherein the device is authenticated to the first communication network based on a credential accessible to a network element of the first communication network;
sending information regarding a location of the device to the first communication network, wherein the network element updates the location of the device based on the information and determines a predicted path upon which the device is predicted to travel;
receiving a signal via the first communication network that a second communication network is available in the predicted path of the device, and wherein the network element transmits the credential to the second communication network based on the predicted path;
accessing the second communication network, wherein the credential is stored prior to the accessing;
sending a second authentication request to the second communication network; and
receiving via the second communication network, an acknowledgement of authentication to the second communication network based on the transmitted credential.

11. The device of claim 10, wherein the device comprises a mobile communication device, and wherein movement of the mobile communication device is determined from the location or predicted from the predicted path.

12. The device of claim 10, wherein the first authentication request is automatically sent responsive to the device being powered ON, and wherein the processing system comprises a plurality of processors operating in a distributed processing environment.

13. The device of claim 10, wherein the device is associated with a subscriber to the first communication network.

14. The device of claim 13, wherein the device is authenticated to the first communication network based on a subscriber credential stored in a data repository of the first communication network.

15. The device of claim 14, wherein the data repository is updated with information regarding accessibility of the second communication network to the device.

16. The device of claim 10, wherein the first communication network comprises an LTE network, a 3G network or a GSM network, and wherein the second communication network comprises a Wi-Fi network.

17. A machine-readable storage medium comprising executable instructions that, when executed by a processing system of a communication device including a processor, facilitate performance of operations comprising:
sending a first authentication request to a first communication network, wherein the communication device is a subscriber device associated with a subscriber to the first communication network, and wherein the communication device is authenticated to the first communication network based on a subscriber credential accessible to a network element of the first communication network;
sending information regarding a location of the communication device to the first communication network, wherein the network element updates the location of the communication device based on the information and determines a predicted path upon which the communication device is predicted to travel;
receiving a signal via the first communication network that a second communication network is available in the predicted path of the communication device, wherein the network element transmits the subscriber credential to the second communication network based on the predicted path;
accessing the second communication network, wherein the subscriber credential is stored prior to the accessing;
sending a second authentication request to the second communication network; and
receiving via the second communication network, an acknowledgement of authentication to the second communication network based on the subscriber credential.

18. The machine-readable storage medium of claim 17, wherein the first authentication request is automatically sent responsive to the communication device being powered ON.

19. The machine-readable storage medium of claim 17, wherein the subscriber credential is stored in a data repository of the first communication network, and wherein the processing system comprises a plurality of processors operating in a distributed processing environment.

20. The machine-readable storage medium of claim 19, wherein the data repository is updated with information regarding accessibility of the second communication network to the communication device.

* * * * *